Figure 1:
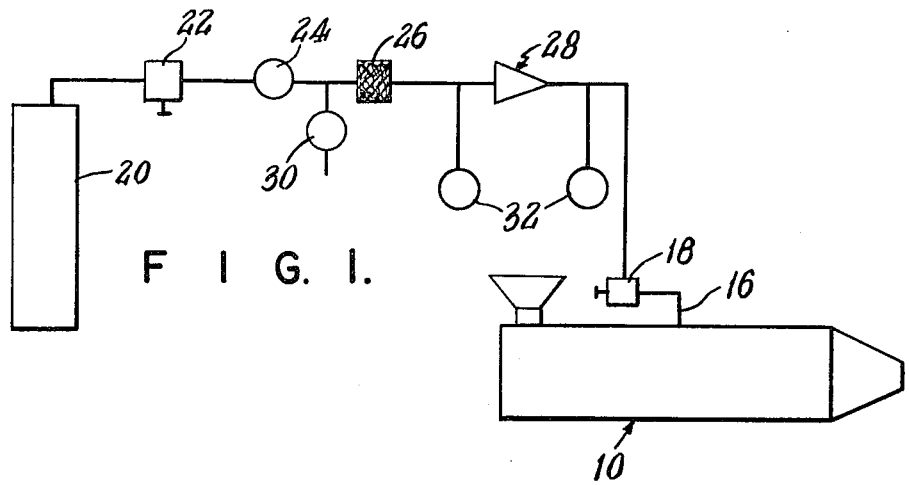

United States Patent [19]
Mulvaney

[11] 3,975,473
[45] Aug. 17, 1976

[54] PROCESS FOR PRODUCTION OF CELLULAR THERMOPLASTIC BODIES

[75] Inventor: William P. Mulvaney, Sommerville, N.J.

[73] Assignee: Union Carbide Corporation, New York, N.Y.

[22] Filed: June 4, 1975

[21] Appl. No.: 583,663

Related U.S. Application Data

[63] Continuation-in-part of Ser. No. 505,274, Sept. 12, 1974, abandoned.

[52] U.S. Cl. .................................. 264/23; 259/191; 264/40.1; 264/45.9; 264/50; 264/211; 264/DIG. 5; 264/DIG. 13; 425/817 C
[51] Int. Cl.² .................. B29D 27/00; B29F 1/06; B29F 3/06
[58] Field of Search ................. 264/50, 51, DIG. 83, 264/DIG. 5, DIG. 13, 50, 45.9, 23, 40, 211; 259/4

[56] References Cited
UNITED STATES PATENTS

| | | | |
|---|---|---|---|
| 2,928,130 | 3/1960 | Gray | 264/50 |
| 2,948,020 | 8/1960 | D'Ascoli | 264/45.9 X |
| 3,068,532 | 12/1962 | Higgins | 264/45.9 |
| 3,071,809 | 1/1963 | Lerch | 264/23 |
| 3,072,584 | 1/1963 | Karpovich | 264/23 |
| 3,120,377 | 2/1964 | Lipschultz et al. | 259/4 |
| 3,268,636 | 8/1966 | Angell | 264/DIG. 83 |
| 3,287,091 | 11/1966 | Nollet et al. | 259/4 X |
| 3,436,446 | 4/1969 | Angell | 264/DIG. 83 |
| 3,663,668 | 5/1972 | Fairbanks | 264/23 |

OTHER PUBLICATIONS

ASTM Designation:D (238–270), "Standard Method of Measuring Flow Rates of Thermoplastics by Extrusion Plastometer," In 1971 Annual Book of ASTM Standards, part 27, Plastics – General Methods of Testing, Nomenclature, Phila., Pa. ASTM, 1971, pp. 415–426.

Bernhardt, Ernest C., "Processing of Thermoplastic Materials," New York, Reinhold, 1959, pp. 15–20, 28–30, 248–253, 269–271.
McKelvey, James M., "Polymer Processing," New York, John Wiley & Sons, 1962, pp. 1–5, 31–34, 111–113.
Whittington, Lloyd R., "Whittington's Dictonary of Plastics," Stamford, Conn., Technomic, 1968, p. 150.
Kirby, Russell B., "An Analysis of Surging in Screw Extruders Pocess Dynamics of Screw Extruders," In SPE Journal, Oct. 1962, pp. 1273–1281.
Perry, John H., "Chemical Engineer's Handbook," Fourth Edition, New York, McGraw-Hill, 1963, pp. 5–5 thru 5–12, 5–56 thru 5–58.
"Design of Piping Systems," The M. W. Kellog Co., Second Edition, New York, John Wiley & Sons, 1965, pp. 279–283, 333–335.
Campbell, Donald P., "Dynamic Behavior of the Production Process, Process Dynamics," New York, John Wiley & Sons, 1958, pp. 99–104.
Krueger, W. L., "Experimental Illustrations of Dynamic Extrusion Theory," In SPE Journal, Oct. 1962, pp. 1282–1287.

*Primary Examiner*—Philip Anderson
*Attorney, Agent, or Firm*—Gerald R. O'Brien

[57] ABSTRACT

A process is provided for the production of a cellular thermoplastic body, wherein solid thermoplastic material is melted under pressure in an extruder, a gaseous blowing agent is injected into the molten thermoplastic material under pressure and said molten thermoplastic material and gaseous blowing agent is passed to a zone of reduced pressure to effect the cellular expansion of said thermoplastic material by said gaseous blowing agent, and wherein said gaseous blowing agent is metered at sonic velocity at a point upstream of the injection of said gaseous blowing agent into said molten thermoplastic material.

16 Claims, 3 Drawing Figures

PROCESS FOR PRODUCTION OF CELLULAR THERMOPLASTIC BODIES

This is a continuation-in-part of my earlier application Ser. No. 505,274, filed Sept. 12, 1974 and now abandoned.

The present invention relates to the production of expanded thermoplastic articles and, more particularly, to a process for the production of such articles.

It has long been known in the extrusion and molding process art to form expanded thermoplastic articles, having fine cells distributed therein, by the general introduction or injection of a gas into the thermoplastic material after it has been rendered molten in the extruder. An example of such a process is disclosed in U.S. Pat. No. 2,928,130 to Gray wherein the gas is injected between stages into a two-stage screw extruder where it is solubilized in the thermoplastic melt and thoroughly admixed in it prior to discharge of the thermoplastic melt containing the solubilized gas from the extruder.

Other variations of this process are also known to the art which is presently keenly aware of the thermoplastic materials which may be employed, the expanding or blowing gases which may be employed and the nucleating agents and other addition agents which may be further advantageously employed in the practice of such process for the production of cellular thermoplastic bodies.

From the standpoint of the resultant article produced by such processes for the production of cellular thermoplastic bodies, it is to be noted that the process may be utilized to produce either a continuous two-dimensional (constant cross-sectional) body of the type produced in the extrusion of wire and cable insulation or in the production of three-dimensional bodies on a noncontinuous basis such as in the production of a series of bodies in a mold.

Generally, gas injection in an extrusion process may advantageously be employed in conjunction with molding processes, such as vacuum molding and injection molding processes. In the case of the latter, the mixture of molten thermoplastic material and gaseous blowing agent is fed to an accumulation zone where a measured volume of the molten thermoplastic material and gaseous blowing agent mixture is collected prior to injection into a mold. Such a process is disclosed in U.S. Pat. No. 3,268,636 to Angell.

As employed herein, the term "mixture of molten thermoplastic material and gaseous blowing agent" is understood to mean either a random or uniform distribution of the gaseous blowing agent within the molten thermoplastic matrix and to include solutions as well as non-homogeneous physical mixtures of the gaseous blowing agent in the molten thermoplastic material matrix.

Difficulty has been encountered in the use of prior thermoplastic polymer extrusion processes for the production of cellular thermoplastic bodies employing the gase injection of an expanding or blowing agent into the molten thermoplastic material in an extruder. Such difficulties are associated with variations in physical properties of the resultant thermoplastic bodies produced by the process due to pressure variations within the extruder which, in turn, cause variations in the volume of the gaseous expanding or blowing agent injected into the molten thermoplastic material. Such pressure variations can be caused by changes in a wide variety of processing variables encountered in extrusion and which are well known to those skilled in the art.

Accordingly, it is the prime object of the present invention to provide an improved process for the production of cellular thermoplastic bodies having substantially uniform physical properties.

It is a further object of the present invention to provide an improved process for the production of cellular thermoplastic bodies wherein substantially uniform volumes of expanding or blowing gas are injected into the thermoplastic material in the extruder.

Other aims and advantages will be apparent from the following description and appended claims.

In accordance with the present invention, a process is provided for the production of a cellular thermoplastic body, wherein solid thermoplastic material is melted under pressure in an extruder, a gaseous blowing agent is injected into the molten thermoplastic material under pressure and said molten thermoplastic material and said gaseous blowing agent is passed to a zone of reduced pressure to effect the cellular expansion of said thermoplastic material by said gaseous blowing agent, and wherein said gaseous blowing agent is metered at sonic velocity at a point upstream of the injection of said gaseous blowing agent into said molten thermoplastic material.

It is to be noted that the following equation sets forth the relationship for determining the critical pressure in the throat of constricting metering nozzle employed in accordance with the present invention:

$$P_c = P_1 \left(\frac{2}{k+1}\right)^{\frac{k}{k-1}} \qquad \text{Eq. I}$$

where
$P_c$ = pressure in nozzle throat
$P_1$ = upstream (regulated) pressure $$k = \frac{C_p}{C_v}$$

where $C_p$, $C_v$ = specific heats at a constant pressure and volume, respectively.

Accordingly, under these conditions, high pressure, constant velocity metering is carried out such that the gas flow (W) in standard cubic feet per hour passing through the metering nozzle is a function only of the upstream pressure ($P_1$) and the area (a) of the nozzle (orifice), as represented by the following formula:

$$\text{Eq. II:} \quad W(\text{ft.}^3/\text{hr.}) = f(P_1, a)$$

Accordingly, it may be seen that, when the blowing gas inlet feed line to the extruder is metered to provide a blowing agent velocity of sonic velocity, the gas flow rate is insensitive to pressure changes at the downstream side of the metering point. Therefore, pressure fluctuations downstream of the metering point and, consequently, within the extruder, will not result in changing the volume of gas injected into the molten thermoplastic stream and will provide uniformity of gas injection and uniformity of porosity in the resultant product.

It has also been found in both profile extrusion (constant cross-sectional extrusion) and three-dimensional extrusion that a wide variety of densities of expanded thermoplastic bodies can be obtained employing the same thermoplastic resin by merely varying the gas volume injected into the thermoplastic material in the extruder. This contrasts with the required prior art practice of changing the thermoplastic resin compound as the volume of gas, and consequent resultant product density, is to be varied.

It is to be understood in connection with the present invention that the metering of the expanding or blowing gas is carried out by passage through a constricting orifice operated so that the gas velocity through the throat of the orifice is at sonic velocity.

It has been found that, when sonic metering of the gaseous blowing agent to be injected into the molten polymer is effected in accordance with the present invention, control of the upstream regulated pressure on the gas flow through the metering orifice is governed by Equation II, set forth hereinabove. Accordingly, the gas flow rate (W) is determined for a given orifice by the upstream regulated pressure ($P_1$). Thus, variation in the regulated upstream pressure over a range above $P_1$ results in a variation of amount of gas injected into the melt and of the density of the resultant cellular thermoplastic body produced in accordance with the invention. Accordingly, upstream pressure $P_1$ is adjusted so that the pressure in the throat of the metering device is the critical pressure ($P_c$) which is at least equal the pressure in the extruder. Thus, the regulated upstream pressure ($P_{ssr\ 1}$) is adjusted to equal or exceed the value required by a transposition of Equation I, i.e.:

$$P_1 = \frac{P_c}{\left(\frac{2}{k+1}\right)^{\frac{k}{k-1}}}$$

It has been found that a wide range of resultant cellular thermoplastic product densities can be obtained merely by the adjustment of upstream regulated pressure in this manner. It is believed that the recognition of this concept is highly significant in that it permits the attainment of desired product density merely by pressure variation and without requiring the prior art selection from among a large number of specific thermoplastic material compounds in order to attain a resultant product density.

It is, of course, to be understood that the term "thermoplastic material", as employed herein, is well known to those skilled in the extrusion and molding arts and includes by way of example such resins as polyethylene, polypropylene, polystyrene, polyvinyl chloride and a wide variety of other synthetic organic resinous materials which are accepted as exhibiting thermoplastic properties, together with blends and copolymers thereof which also exhibit such properties. In addition, the resins may contain in relatively small amounts various chemical and/or physical property modifiers or additives such as are well known to the art.

Expanding or blowing gas employed in the process of the invention should preferably (especially for wire and cable applications) be chemically inert toward, and preferably soluble in the base polymer of the expandable composition. Preferably, the expansion agent should also not thermally decompose under the intended operating conditions and would thus include inert gases, such as nitrogen, argon, helium, neon, carbon dioxide and the like.

Other expansion agents may be used. Thus, such expansion agents would include the fluorocarbon type blowing agents.

While the use of nucleating agents is not required in the broadest aspects of the process of the present invention, it has been found preferable to employ such nucleating agents.

The nucleating agents which may be used in the compositions of the present invention are materials which provide fine particle sized nucleating sites in the ethylene or propylene base polymer during the expansion or blowing thereof, as described below.

The particle size of the nucleating agents should be of the order of about 0.01 to 50 microns. Such materials would include polytetrafluoroethylene, azodicarbonamide, p,p'-oxy-(bis(benzene sulfonyl hydrazide), trihydrazinosym-triazine, and p-toluene sulfonyl semicarbazide.

The nucleating agents may be used individually or in combination thereof.

The nucleating agents should be dispersed as uniformly as possible throughout the mass of the base polymer. They should also preferably (for wire and cable applications) be chemically inert toward and insoluble in the base polymer and any other components of the expandable composition of the present invention.

Figure 2:
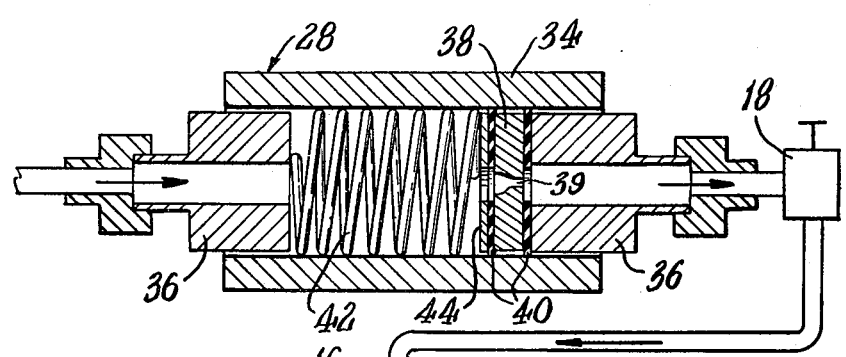
Figure 3:
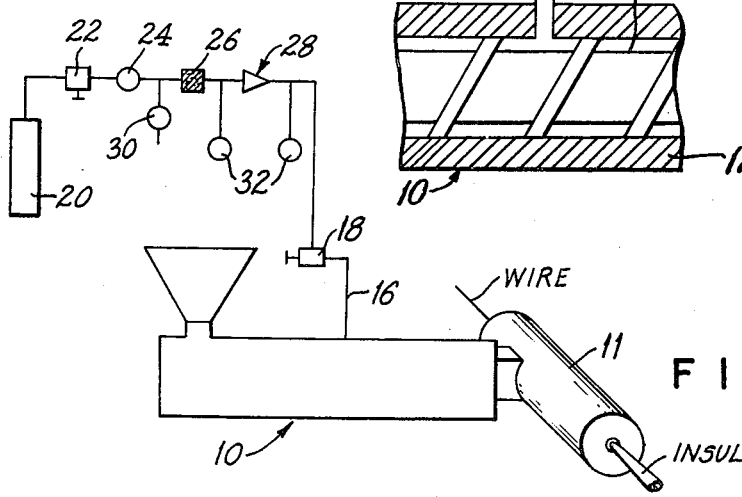

In the drawings:

FIG. 1 sets forth, in schematic form, apparatus which may be employed in the practice of the process of the invention;

FIG. 2 is an exploded sectional view of the metering and gas injection apparatus shown schematically in FIG. 1; and FIG. 3 is a schematic view of extruder and associated wire coating die means for producing conductors having a coating of foamed thermoplastic polymer.

Referring specifically to the embodiment of the FIGS. of the drawings, extruder 10 is employed to effect the melting of thermoplastic material and the injection and mixing of expanding or blowing gas. The extruder 10 comprises outer housing means 12 and inner screw member 14. Expanding or blowing gas is introduced into the extruder 10 through inlet port means 16 having valve means 18 positioned upstream thereof. The expanding or blowing gas is contained in reservoir 20 at a pressure equal to or higher than that employed throughout the rest of the system, e.g., 6000 psig. Positioned successively in the gas line between gas reservoir 20 and valve 18 are an adjustable high pressure regulator 22, shut-off valve 24, gas line filter 26 and orifice housing member 28. As shown in FIG. 1, bleed-off valve 30 is positioned off the line between the shut-off valve 24 and line filter 26. In addition, dial pressure indicators 32 are advantageously positioned off the line on both the upstream and downstream sides of the orifice housing member 28.

As shown in FIG. 2, orifice housing member 28 is comprised of an outer cylndrical member 34 with retaining members 36 positioned at opposite ends thereof to enclose the gas metering assembly. This assembly consists of cylindrical orifice member 38, having a central orifice 39, retained between a pair of rubber gaskets 40 and held in place against the face of downstream retaining member 36 by the action of spring member 42 through washer 44 acting against the face of upstream retaining member 36.

EXAMPLE 1

In an example of the present invention, a 0.315 inch in diameter CATV cable was made by the process of the present invention employing a 0.064 inch O.D. (outer diameter) copper wire as the inner conductor and 0.005 inch thick tape of aluminum as the outer conductor. The dielectric layer was formed from a composition containing 99.9 weight percent of a copolymer of ethylene and butene compound having a density of 0.95 gr/cc and a melt index of 0.2 dg/min. and 0.1 weight percent of azodicarbonamide.

The dielectric composition was processed in apparatus as described above and shown in FIGS. 1-3. A 2-½ inch diameter single stage screw extruder was employed having a length to diameter ratio of 20:1. The feed zone, transition zone and metering zone of the extruder were 4/6/10 diameters in length, respectively. The barrel or housing 12, of the extruder was heated to about 151°C. near the inlet end of the extruder, to about 151°C. in the vicinity of the inert gas port and to about 151°C. at the outlet end of the extruder. The extruder screw 14, was operated at a speed of 30 rpm (revolutions per minute) and the pressure in the head of the extruder was 1000 psig. Nitrogen gas was used as the inert gas expansion or blowing agent and was injected into the molten polymer in the extruder under a pressure of 500 psig., while the regulated pressure was 2300 psig. A gas metering orifice 0.00055 inch in diameter was used to meter the gas. The nitrogen was fed into the extruder at the rate of about 0.66 standard cubic feet per hour, at a point which was 7.7 diameters (screw) from the outlet end of the extruder. This point was located at a distance from the outlet end of the extruder which was about 37 percent the length of the extruder. The ethylene polymer based dielectric composition was completely molten by the time it reached the nitrogen inlet port.

The molten dielectric composition, with the nitrogen gas dispersed therein, was then passed through a wire coating die head 11, at a temperature of about 151°C. and at a pressure of about 1000 psig. The dielectric composition was processed in the extruder at a rate of feed of about 52.5 pounds per hour.

The inner conductor was not preheated and passed through the diehead at a rate of 45 feet per minute. A 0.218 inch vinyl resin coating die and a guider tip with an inner diameter of 0.067 inch were used in the die head. The dielectric composition was extruded onto the conductor, and it expanded, outside the die head, to form a cellular composition having a density of 0.45 gr/cc and a uniform cell structure in which the cells had an average diameter within the range of 2.0 to 4.8 mils.

The outer conductor was then applied to the core member prepared above to obtain an O.D. of the cable of 0.412 inch. The cable did not have to be dried. About 300 feet of this cable core was prepared. Laboratory tests of samples from this cable show it to have a uniform dissipation factor of 80 $\mu r$ at 50 mega Hertz and a dielectric constant of 1.5; and a resultant calculated attenuation of 0.549 db/100' at 50 mega Hertz and 1.39 at 300 mega Hertz.

EXAMPLE 2

In another example, a 0.059 inch diameter telephone signal wire was produced in accordance with the process of the present invention employing 0.0201 inch O.D. (outer diameter) copper wire as the inner conductor.

The dielectric layer was formed from the same composition as employed in Example 1.

The dielectric composition was processed, as described above, in a 2-½ inch diameter two-stage screw extruder having a length to diameter ratio of 20:1. Each of the feed zone, transition zone and metering zone in the extruder were 4/6/10 diameters in length, respectively, with the decompression zone of the second stage approximately 7.7 diameters from the end of the screw in the metering section. The barrel or housing 12, of the extruder was heated to about 350°F. in the vicinity of the inert gas inlet port, and to about 350°F. at the outlet end of the extruder. The extruder screw 14, was operated at a speed of 20 rpm and the pressure in the head of the extruder was 1700 psig. Nitrogen gas was used as the gaseous blowing agent and it was injected into the molten polymer in the extruder under a pressure of 800 psig while the regulated pressure was 1700 psig. A gas metering orifice 0.00055 inch in diameter was used to meter the gas. The nitrogen was fed into the extruder at a point which was 7.7 screw diameters or about 37 percent the length from the outlet end of the extruder. The ethylene polymer based dielectric composition was completely molten by the time it reached the nitrogen inlet port.

The molten dielectric, with nitrogen dispersed therein, was then passed through a wire coating die head 11, maintained at a temperature of about 370°F. and a pressure of about 1700 psig. The dielectric composition was processed in the extruder at a rate of feed of about 24.0 pounds per hour.

The inner conductor was not preheated and was passed through the die head at a rate of 1700 feet per minute. A 0.050 inch vinyl resin coating die and a guider tip with an inner diameter of 0.021 inch were employed in the die head. The dielectric composition was extruded onto the conductor, was expanded, outside the die head, to form a cellular composition having a density of 0.55 gr/cc and a uniform cell structure in which the cells had an average diameter of 2.0 to 5 mils. A few thousand feet of this coated conductor were prepared. The insulation had a dielectric constant of 1.65.

EXAMPLE 3

A further example of the present invention was carried out employing apparatus and process conditions generally as described in Example 2, wherein the thermoplastic material was 99.9 weight percent polypropylene having a melt flow of 5.0 dg/min and a density of 0.905 gr/cc and containing 0.1 percent azodicabonamide as nucleating agent. The telephone single wire thereby produced had the same excellent physical properties obtained in the telephone single wire of Example 2. The regulated pressure was 1250 psig, the pressure at the gas injection port was 650 psig and the resulting density was approximately 0.45 gr/cc.

EXAMPLE 4

A further example of the process was carried out, employing parameters as in Example 2, with a thermoplastic composition of 99.85 weight percent of an ethylene homopolymer having a density of 0.921 gr/cc and a melt index of 0.1 dg/min., 0.1 weight percent of azodicarbonamide, and 0.05 weight percent of 1,3,5,-trimethyl-2,4,6-tris(3,5-tertbutyl-4 -hydroxybenzyl)

benzene. The regulated pressure was 2000 psig, the pressure at the injection port was 1000 psig and the resultant extrudate had a density of 0.6 gr/cc with a dielectric constant of 1.72.

EXAMPLE 5

A further example of the process of the invention was carried out, employing the parameters set forth in Example 2, wherein the thermoplastic material was a mixture of 93.4 percent low density polyethylene (0.1 dg/min melt index, 0.92 gr/cc density), 6.5 percent copolymer of high density polyethylene having a melt index of 0.1 dg/min and a density of 0.955 gr/cc and 0.18 weight percent of azodicarbonamide. The regulated pressure was 1500 psig, the pressure at the injection port was 790 psig and the extrudate density was 0.6 gr/cc with a dielectric constant of 1.72.

EXAMPLE 6

A still further example of the process of the present invention was carried out employing as the thermoplastic material a copolymer of ethylene containing 97.4 percent ethylene and, 2.5 percent vinyl acetate and 0.1 percent azodicarbonamide. The parameters employed were those set forth hereinabove with respect to Example 2 and the telephone single wire produced had substantially the same density as obtained in Example 2. The regulated pressure was 1800 psig, the pressure at the injection port was 900 psig, and the extrudate density was 0.65 gr/cc with a dielectric constant of approximately 1.8.

EXAMPLE 7

Using a 20/1 L/D extruder with a 3 to 1 depth compression ratio, a compound consisting of low density polyethylene polymer of 0.92 gr/cc density and 0.1 dg/min melt index and 0.1 percent azodicarbonamide was extruded while nitrogen gas was injected into the side of the extruder using the sonic gas metering method. The compound was extruded at a melt temperature of 155°C. The barrel pressure at the injection port was 1300 psig. The pressure downstream (the regulated pressure) of the 0.0003 inch diameter sonic metering orifice was 2800 psig. While the screw was rotating at 15 rpm and the compound was being extruded at 160 gr/min., the regulated pressure of 2800 psig caused gas to be fed to the extruder so that a continuous uniform rod extrudate of 0.280 inch was extruded at density of 0.65 gr/cc. The extrudate was composed of bubbles whose cell size was 0.012 to 0.014 inch in diameter. The screw used was a Davis Standard mixing screw with 4 sets of mixing pins. This screw had a feed/transition/meter section of 4/6/10 diameters length. The extruder has 5 temperature zones, Zone 1, Zone 2, Zone 3, the neck, and head; that were set at 290°F., 290°F., 290°F., 280°F., and 280°F. The pressure profile at the three pressure taps used was 1300 psig, 900 psig, and 1500 psig at the head just before the breaker plate located at the end of the extruder. The pressure taps were located at 28, 11, and ½ inches from the breaker plate.

When the regulated pressure was increased to 3300 psig, the extruder barrel pressure remained the same at 1300 psig. The continuous uniform extrudate's density changed to 0.5 gr/cc while the other parameter of temperature, pressure and rpm remained the same. The extrudate cell size was 0.008 to 0.014 inch in diameter. The O.D. of the rod was 0.26 inch. The example points up the fact that, while using a single compound, extrudates of profile form can be continuously and uniformly extruded at various uniform densities using sonic metering by merely changing the regulated pressure.

EXAMPLE 8

The equipment was the same as in Example 7. The polymer used was a compound of a 0.92 gr/cc density, 0.1 dg/min melt index polyethylene homopolymer and 0.05 percent azodicarbonamide. The barrel pressure at the injection port was 1380 psig. The regulated pressure was 2900 psig, and the resulting extrudate density was 0.53 gr/cc while melt temperature was 155°C. while the screw was rotating at 14 rpm. The cell size was 0.006 to 0.008 inch. The O.D. of the rod was 0.254 inch.

When the regulated pressure was increased to 3850 psig, the resulting extrudate was 0.49 gr/cc. The cell size was 0.006 to 0.012 inch and the O.D. of the rod was 0.279 inch. The injection port pressure was 1350 psig.

When the regulated pressure was reduced to 2600 psig, the resulting extrudate was 0.68 gr/cc and the cell size was 0.008 to 0.012 inch. The O.D. of the rod was 0.244 inch.

The temperature, pressure and rpm were essentially the same as in Example 7.

EXAMPLE 9

The equipment employed was the same as in Example 7. The compound was an ethylene-ethyl acrylate copolymer containing 17 weight percent ethyl acrylate having 0.93 gr/cc density and 4.5 dg/min melt index, with 0.1 percent azodicarbonamide. The barrel pressure at the injection port was 1000 psig. The regulated pressure was 2000 psig and the resulting extrudate was 0.70 gr/cc while the melt temperature was 160°C. The pressure profile at the three pressure taps was 1300 psig, 400 psig and 800 psig at the head just before the breaker plate. The cell size of the extrudate was from 0.003 to 0.005 inch in diameter and the rod O.D. was 0.254 inch.

When the regulated pressure was increased to 2500 psig, the resulting extrudate was 0.57 gr/cc. The injection port pressure was 1000 psig. The cell size of the extrudate was from 0.005 to 0.007 inch in diameter and the rod O.D. was 0.265 inch.

EXAMPLE 10

The equipment employed was the same as in Example 7. The compound was a copolymer of ethylene and butene with a density of 0.95 gr/cc and a 0.25 dg/min melt index with 0.1 percent azodicarbonamide. The barrel pressure at the injection port was 400 psig. The regulated pressure was 900 psig and the resulting extrudate was 0.5 gr/cc while the melt temperature was 167°C. The pressure profile at the three pressure taps was 300 psig, 0 psig and 1000 psig. The cell size of the extrudate was from 0.004 to 0.007 inch and the rod O.D. was 0.308 inch.

The regulated pressure was decreased to 450 psig, when the barrel pressure dropped to 200 psig. The resulting extrudate was 0.65 gr/cc. The cell size of the extrudate was from 0.005 to 0.007 inch and the rod O.D. was 0.306 inch in diameter.

EXAMPLE 11

The equipment employed was the same as in Example 7. The polymer was a 0.905 gr/cc polypropylene resin with a melt flow of 5.0 dg/min. The barrel pressure at the injection port was 200 psig. The regulated pressure was 700 psig, and the resulting extrudate was 0.4 gr/cc while the melt temperature and screw rpm were 182°C. and 15 rpm. The extrudate cell size was from 0.020 inch to an open cell structure. The rod O.D. was 0.407 inch in diameter. When the rpm was increased to 50, the melt temperature dropped to 180°C., the injection port pressure to 100 psig and the regulated pressure was adjusted to 300 psig, the resulting extrudate density increased to 0.67 gr/cc and extruder output rate was 155 gr/min. The extrudate cell size was about 0.024 inch average, the cell structure was closed and the rod O.D. was 0.373 inch. Both of these foams were formed without the aid of a nucleator and were coarse. The bubble size of the 0.4 gr/cc sample varied from an average of 0.020 inch to an open cell structure. The bubble size of the 0.67 gr/cc samples was about 0.024 inch average and bubbles could clearly be seen as opposed to an opaque surface which hides the internal bubble structure.

EXAMPLE 12

The equipment and the resin employed were the same as in Example 11, except that 0.1 percent azodicarbonamide was added to the resin as a cell nucleator. The barrel pressure at the injection port was less than 100 psig. The regulated pressure was 450 psig while the melt temperature and rpm were 180°C. and 25, respectively. These settings resulted in an extrudate of 0.63 gr/cc with a smooth, uniform opaque surface and an internal cell structure ranging in size from 5 to 8 mils (0.005 to 0.008 inches) in diameter. The rod O.D. was 0.435 inch in diameter.

When the regulated pressure was increased to 800 psig, the injection port pressure remained at less than 100 psig and the extrudate density decreased to 0.50 gr/cc. The cell size ranged from an average of 0.005 inch to 0.008 inch. The rod O.D. was 0.391 inch.

Examples 11 and 12 show that a better product is obtained using nucleators to control cell size and obtain an opaque smooth surface; and also that the extrudate density can be varied by changing the regulated pressure.

EXAMPLE 13

The equipment employed was the same as in Example 7, but the polymer was a 1.04 gr/cc polystyrene resin with a 1.4 ft.-lb./in. impact strength. This resin was extruded without nucleators. The injection port pressure was 450 psig, the regulated pressure was 900 psig, the melt temperature was 193°C, the extruder rpm was 20, the output rate was 248 gr/min. and the resulting extrudate density was 0.95 gr/cc. The cell size was about 0.03 inch average and the rod O.D. was 0.288 inch. When the regulated pressure was increased to 2500 psig, the density decreased to 0.77 gr/cc and the cell size was about 0.050 inch average. The rod O.D. was 0.300 inch.

EXAMPLE 14

The equipment employed was the same as in Example 7, except that the extrusion profile die diameter was changed to 0.250 inch and the polymer used was a heat stabilized polyvinylchloride (PVC) copolymer of a type similar to a chemical blown commercially formulated PVC (without the blowing agent). In the formulation, a number of ingredients could have acted as nucleators. These ingredients are calcium carbonate, unmelted PVC powder or the impact modifier. The compound has a density of 1.3 gr/cc as a solid, but when extruded under the following conditions the density was reduced to 0.5 gr/cc. The injection port pressure was 2210 psig. The regulated pressure was 4200 psig while the melt temperature and rpm were 182°C. and 15. The extruder output rate was 270 gr/min. The cell size was 0.006 to 0.009 inch in diameter and the rod O.D. was 0.800 inch.

What is claimed is:

1. In the process for the production of a cellular thermoplastic body, wherein solid thermoplastic material is melted under pressure in an extruder, a gaseous blowing agent is injected into the molten thermoplastic material under pressure and admixed and through the mixture of said molten thermoplastic material and said gaseous blowing agent is passed to a zone of reduced pressure to effect the cellular expansion of said thermoplastic material by said gaseous blowing agent, the improvement which comprises metering said gaseous blowing agent at sonic velocity at a point upstream of the injection of said blowing agent into said molten thermoplastic material.

2. The process in accordance with claim 1, wherein said mixture of molten thermoplastic material and injected blowing agent are passed through a wire coating die and onto a conductor to form a coated conductor.

3. The process in accordance with claim 1, wherein said thermoplastic material is selected from the group consisting of polyethylene, polypropylene, and polystyrene and said gaseous blowing agent is gaseous nitrogen.

4. The process in accordance with claim 1, wherein said gaseous blowing agent is metered through a device having a constricting orifice which causes the gas velocity of said gaseous belowing agent to be sonic through the throat of said orifice and thereby effecting injection of said gas into said molten thermoplastic material at a controllable uniform rate unaffected by the material back pressure.

5. In the process for the production of a cellular thermoplastic body, wherein solid thermoplastic material is melted under pressue in an extruder, a soluble gaseous blowing agent is injected into the molten thermoplastic material under pressure and admixed therewith the mixture of said molten thermoplastic material and the solubilized gaseous blowing agent is passed from said extruder to a zone of reduced pressure to effect the cellular expansion of said thermoplastic material by said gaseous blowing agent, the improvement which comprises metering said gaseous blowing agent at sonic velocity at a point upstream of said extruder prior to injection of said blowing agent into said extruder.

6. The process in accordance with claim 5, wherein said mixture of molten thermoplastic material and injected blowing agent are passed through a wire coating die and onto a conductor to form a coated conductor.

7. The process in accordance with claim 5, wherein said thermoplastic material is selected from the group consisting of polyethylene, polypropylene, and polystyrene and said gaseous blowing agent is gaseous nitrogen.

8. The process in accordance with claim 5, wherein said gaseous blowing agent is metered through a device having a constricting orifice which causes the gas velocity of said gaseous blowing agent to be sonic through the throat of said orifice and thereby effecting injection of said gas into said extruder at a controllable uniform rate unaffecteed by the extruder back pressure.

9. The process for the production of a cellular thermoplastic body comprising melting under pressure in an extruder a solid thermoplastic material, metering a stream of gaseous blowing agent at sonic velocity prior to injection under pressure into the molten thermoplastic material to provide a mixture of said gaseous blowing agent in said molten thermoplastic material, passing said mixture of molten thermoplastic material and said gaseous blowing agent to a zone of reduced pressure to effect the cellular expansion of said thermoplastic material by said gaseous blowing agent, and varying the pressure of said stream of gaseous blowing agent at a point upstream of the point of metering to obtain the desired variation in density of the expanded cellular thermoplastic material.

10. The process in accordance with claim 9, wherein said mixture of molten thermoplastic material and gaseous blowing agent is passed through a wire coating die and onto a conductor to form a coated conductor.

11. The process in accordance with claim 9, wherein said thermoplastic material is selected from the group consisting of polyethylene, polypropylene and polystyrene and said gaseous blowing agent is gaseous nitrogen.

12. The process in accordance with claim 9, wherein said gaseous blowing agent is metered through a device having a constricting orifice which causes the gas velocity of said gaseous blowing agent to be sonic through the throat of said orifice and thereby effecting injection of said gas into said molten thermoplastic material at a controllable uniform rate unaffected by the material back pressure.

13. The process for the production of a cellular thermoplastic body comprising melting under pressure in an extruder a solid thermoplastic material, metering a stream of gaseous blowing agent at sonic velocity prior to injection under pressure into the molten thermoplastic material to provide a mixture of said gaseous blowing agent in said molten thermoplastic material, passing said mixture of molten thermoplastic material and said gaseous blowing agent from said extruder to a zone of reduced pressure to effect the cellular expansion of said thermoplastic material by said gaseous blowing agent, and varying the pressure of said stream of gaseous blowing agent at a point upstream of the point of metering to obtain the desired variation in density of the expanded cellular thermoplastic plastic material.

14. The process in accordance with claim 13, wherein said mixture of molten thermoplastic material and said gaseous blowing agent is passed through a wire coating die and onto a conductor to form a coated conductor.

15. The process in accordance with claim 13, wherein said thermoplastic material is selected from the group consisting of polyethylene, polypropylene and polystyrene and said gaseous blowing agent is gaseous nitrogen.

16. The process in accordance with claim 13, wherein said gaseous blowing agent is metered through a device having a constriction orifice which causes the gas velocity of said gaseous blowing agent to be sonic through the throat of said orifice and thereby effecting injection of said gas into said extruder at a controllable uniform rate unaffected by the extruder back pressure.

* * * * *

UNITED STATES PATENT OFFICE
CERTIFICATE OF CORRECTION

Patent No. 3,975,473            Dated August 17, 1976

Inventor(s) William P. Mulvaney

It is certified that error appears in the above-identified patent and that said Letters Patent are hereby corrected as shown below:

On the Abstract page, References Cited - Other Publications:

ASTM Designation: "D (238-270)" should read "D (1238-70)".

In the Kirby, Russell B. reference, line 2 thereof, "Pocess" should read "Process".

Col. 1, line 60, "gase" should read "gas".

Col. 2, line 54, in Eq. II, "f" should read "$f$".

Col. 3, line 30, "($P_{s81}$)" should read "$P_1$".

Col. 3, line 35, "$\frac{k}{h\,1}$" should read "$\frac{k}{k-1}$".

Col. 4, line 5, "invn-" should read "inven-".

Col. 6, line 68, delete the hyphen before "hydroxybenzyl".

Col. 10, line 20 (Claim 1), after "admixed" insert "therewith", and delete "through".

Col. 10, line 51 (Claim 5), before "the" insert "and".

Col. 12, line 18 (Claim 13), delete "plastic".

Col. 12, line 31 (Claim 16), "constriction" should read "constricting".

Signed and Sealed this

Twenty-third Day of November 1976

[SEAL]

Attest:

RUTH C. MASON
Attesting Officer

C. MARSHALL DANN
Commissioner of Patents and Trademarks